UNITED STATES PATENT OFFICE.

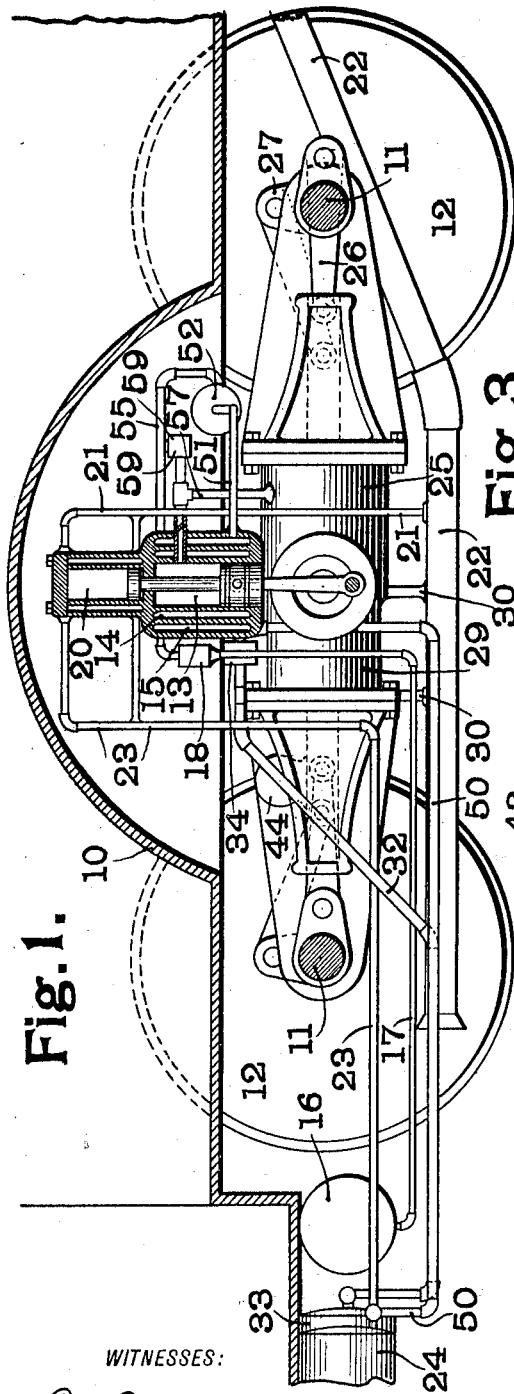
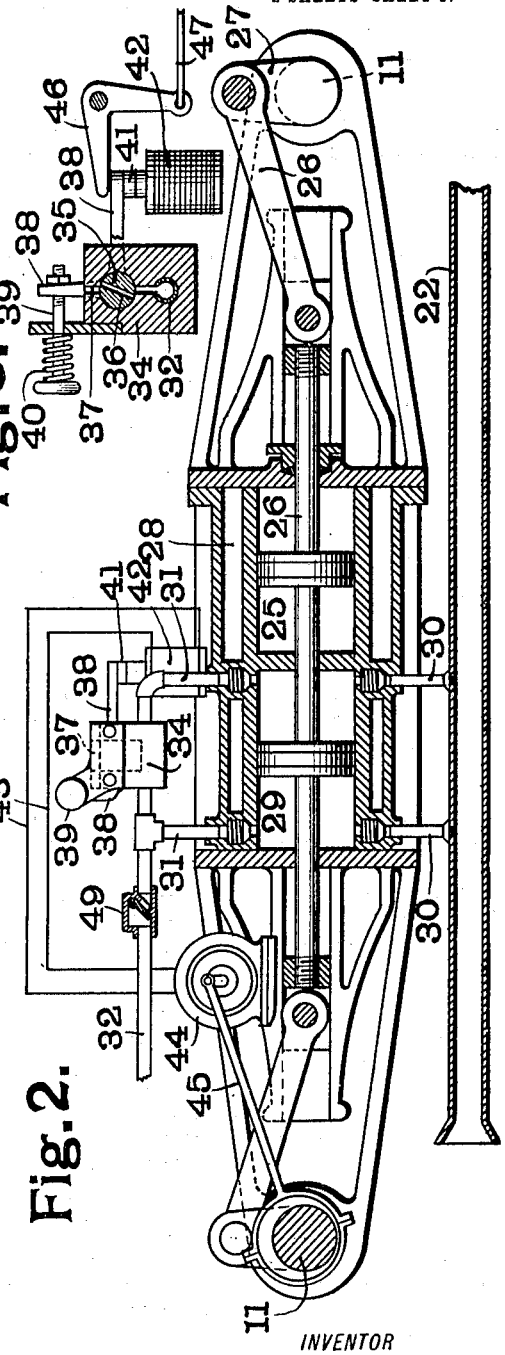

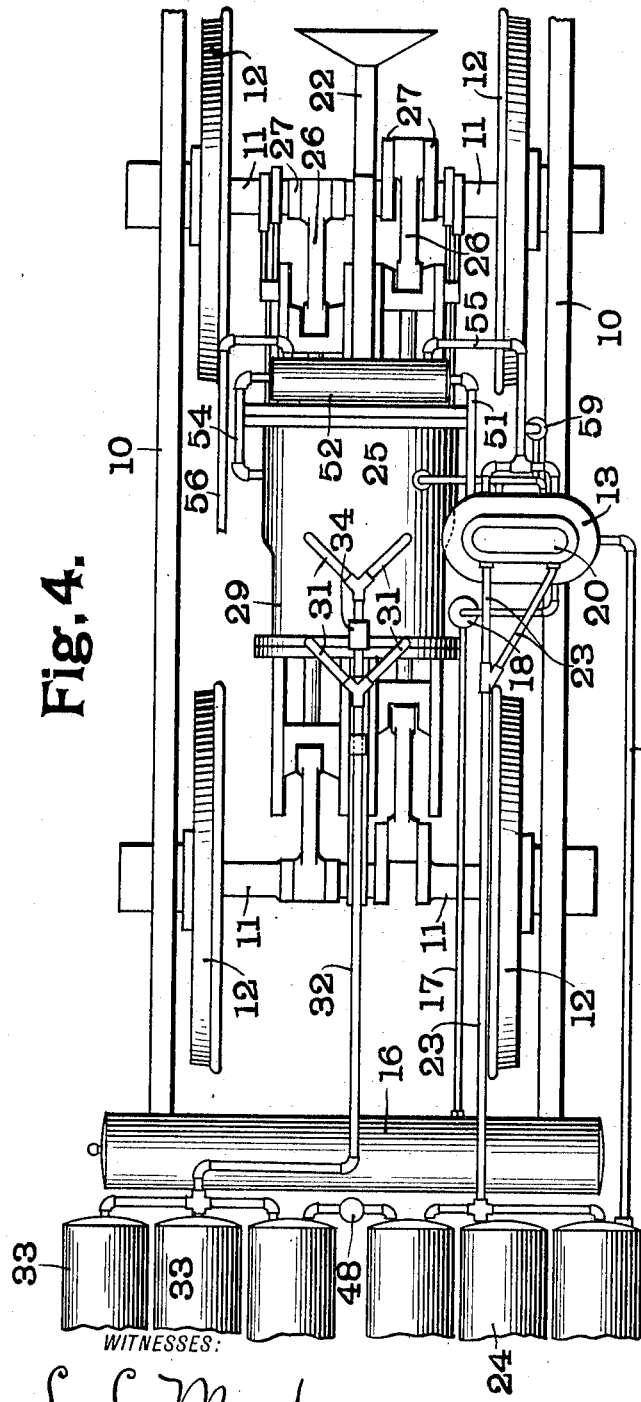

WILLIAM G. THUMMEL, OF ST. LOUIS, MISSOURI.

MOTOR-VEHICLE.

1,048,232.  Specification of Letters Patent.  Patented Dec. 24, 1912.

Application filed January 16, 1911. Serial No. 602,764.

*To all whom it may concern:*

Be it known that I, WILLIAM G. THUMMEL, a citizen of the United States, residing at the city of St. Louis, State of Missouri, have invented a certain new and useful Motor-Vehicle, of which the following is such a full, clear, and exact description as will enable any one skilled in the art to which it appertains to make and use the same, reference being had to the accompanying drawings, forming part of this specification.

My invention relates to a motor vehicle, and more particularly to one in which an internal combustion engine is used as the prime motive power.

The object of my invention is to so combine the internal combustion engine with air compressors and a compressed air engine that the momentum usually lost by applying the brakes to the vehicle may be utilized in storing up energy to aid in the propulsion of the vehicle.

Another object of my invention is to utilize the heat of the exhaust to increase the pressure and volume of the air and to thus utilize the energy usually wasted in the exhaust of an internal combustion engine.

In the accompanying drawings which illustrate one form of vehicle made in accordance with my invention Figure 1 is a vertical longitudinal section; Fig. 2 is an enlarged section through the compressed air engine and the air compressor driven thereby; Fig. 3 is an enlarged sectional view showing the valve mechanism for controlling the air compressor; Fig. 4 is a top plan view; Fig. 5 is an enlarged view showing the super-heater and Fig. 6 is an enlarged sectional view showing the connection for controlling the direct admission of the products of combustion from the internal combustion engine to the compressed air engine.

Like marks of reference refer to similar parts in the several views of the drawings.

10 represents the frame of the vehicle. This frame is provided with axles 11 on which are mounted the wheels 12. Carried by the frame 10 is an internal combustion engine 13 provided with the usual water jacket 14 and also with an air jacket 15, preferably surrounding the water jacket 14. This engine 13 is supplied with fuel from a fuel tank 16 through a feed pipe 17 containing the usual carbureter 18. The internal combustion engine 13 is not directly connected with the wheels 12 but is used to drive an air compressor 20 which is preferably connected in tandem therewith, as shown in Fig. 1. This air compressor 20 preferably receives its air through an intake pipe 21 leading to an air conduit 22 extending to the front of the vehicle. The air from the compressor 20 is led by means of a pipe 23 to low pressure tanks 24 forming part of a compressed air reservoir. The air thus stored in the tanks 24 is used to drive the main compressed air engine 25. This compressed air engine 25 is connected by means of rods 26 directly to cranks 27 on the axles 11. The compressed air engine 25 may be provided with any suitable number of cylinders. In the drawings I have shown two. These cylinders are provided with an air chest 28 similar to the steam chest of a steam engine except that the said chest completely surrounds the cylinders. This air chest 28 receives the air from the low pressure tanks 24 in a manner which will be hereafter described in detail. Mounted in tandem with each of the cylinders of the compressed air engine 25 is an air compressor 29, best shown in Fig. 2. These air compressors 29 preferably receive their air through intake pipes 30 connected with the air conduit 22 hereinbefore described. The outlet pipes 31 from the air compressor 29 are connected with a pipe 32 leading to high pressure tanks 33 which together with the low pressure tanks 24 hereinbefore described constitute the compressed air reservoir of the vehicle. During the normal operation of the vehicle the compressor 29 is not intended to do any work, consequently the pipe 32 is supplied with a valve 34 shown in detail in Fig. 3. This valve 34 is provided with a plug 35 having a port 36 which is normally in alinement with the port 37 leading from the pipe 32 to the atmosphere, so that no work will be done by the air compressor 29 while the plug 35 is in its normal position. Secured to the plug 35 is a bell crank lever 38, one arm of which has an adjustable connection with a rod 39 provided with a coil spring 40 which normally holds the valve in its open position. The opposite end of the bell crank lever 38 is secured to an armature 41 adapted to be attracted by a magnet 42. In order to automatically close the valve 34 to throw the air compressor 29 into operation when the vehicle attains a predetermined speed I connect the magnet 42 by means of wires 43 with a generator 44 driven by an eccentric rod 45 from one of the axle rods 11. It will be evident that when the predetermined speed is attained the attraction of the magnet 42 will be sufficient to overcome the spring 40 and close the valve 34, thus throwing the compressor 29 into operation so as to retard the speed of the vehicle and at the same time utilize the momentum to pump air through the pipe 32 into the high pressure tanks 33.

In order to operate the valve 34 by hand so as to utilize the air compressor 29 as a brake, I provide a bell crank lever 46 which is adapted to bear against the bell crank lever 38 and has attached to it an operating rod 47 extending to a point within reach of the motorneer. By means of this connection the compressor 29 may be manually thrown into operation so as to act as a brake and at the same time utilize the momentum for storing up energy in the tanks 33. The air from the high pressure tanks 33 passes into the low pressure tanks 24 through a reducing valve 48, Fig. 4.

In order to utilize the exhaust products of combustion from the engine 13 to heat the air used in driving the engine 25, the air from the tanks 24 is not conducted directly to the air chest 28 but passes through a pipe 50 to the air jacket 15 of the engine 13 so as to absorb a portion of the heat generated by the engine. From the air jacket 15 the air passes through a pipe 51 to a super-heater 52 which also acts as a muffler for the engine 13. This super-heater 52 is provided with air tubes 53 through which the air passes to a pipe 54 leading into the air chest 28. The products of combustion from the exhaust port of the engine 13 are carried by means of a pipe 55 into the space surrounding the air tubes 53 and pass out from said space through an exhaust pipe 56 and are exhausted into the atmosphere. The products of combustion are thus utilized to heat the air as it passes through the super-heater 52. In order to still further heat the air in the air chest 28 I provide a shunt pipe 57 shown in detail in Fig. 6. This shunt pipe 57 leads directly from the combustion chamber of the engine 13 to the air chest 28. The pipe 57 enters the combustion chamber of the engine 13 at some distance from its upper end so that it is covered by the piston during the first part of its working stroke. After the piston has moved down a certain distance the pipe 57 is uncovered so that the products of combustion pass directly through the pipe 57 into the air chest 28. The pipe 57 is provided with a valve 58 which allows the pressure in the combustion chamber to be reduced only to a certain predetermined amount after which the flow of gases is stopped so as to maintain sufficient pressure in the combustion chamber to complete the stroke. In case the pressure in the air chest 28 is too great for the gases to enter therein they pass off through a blow-off valve 59 into the exhaust pipe 55 hereinbefore described and so pass into the superheater 52.

It will be evident from the above description that the momentum of the car when going down grade or when being brought to a stop in place of being wasted in friction upon the wheels is utilized to store up energy which is used in the useful propulsion of the vehicle and at the same time the heat from the exhaust products of combustion is utilized to increase both the temperature and pressure of the air utilized in the driving engine.

Having fully described my invention what I claim as new and desire to secure by Letters Patent of the United States, is:

1. The combination with an internal combustion engine, of an air compressor driven thereby, a compressed air engine, a second air compressor, said second air compressor being connected with said compressed air engine, and means for throwing said second air compressor into and out of operation.

2. The combination with an internal combustion engine, of an air compressor driven thereby, a compressed air engine, a second air compressor, said second air compressor being connected with said compressed air engine, and automatic means for throwing said second air compressor into and out of operation.

3. The combination with an internal combustion engine, of an air compressor driven thereby, a compressed air engine, a second air compressor, said second air compressor being connected with said compressed air engine, automatic means for throwing said second air compressor into and out of operation, and manually operated means for throwing said second air compressor into and out of operation.

4. The combination with an internal combustion engine, of an air compressor connected in tandem with said engine, a compressed air engine, a second air compressor, said second air compressor being connected with said compressed air engine, and means for throwing said second air compressor into and out of operation.

5. The combination with an internal combustion engine, of an air compressor connected in tandem therewith, a compressed air engine, a second air compressor connected in tamden with said compressed air engine, and means for throwing said second air compressor into and out of operation.

6. The combination with an internal combustion engine, of an air compressor driven thereby, a reservoir comprising high and low pressure tanks, said air compressor being connected with said low pressure tank, a compressed air engine, a second air compressor connected with said compressed air engine and with said high pressure tank, and means for throwing said second air compressor into and out of operation.

7. The combination with an internal combustion engine, of an air compressor driven thereby, a compressed air engine, said air compressor communicating with said compressed air engine, a shunt passage leading from the cylinder of said internal combustion engine to said compressed air engine, and means for closing said shunt passage against the flow of the products of combustion below a predetermined pressure.

8. The combination with an internal combustion engine, of an air compressor driven thereby, a compressed air engine, a super-heater receiving the exhaust from said internal combustion engine, said air compressor communicating with said compressed air engine through said super-heater, a shunt passage leading from the cylinder of said internal combustion engine to said compressed air engine, and means for closing said passage against the flow of the products of combustion below a predetermined pressure.

9. The combination with an internal combustion engine, of an air compressor driven thereby, a compressed air engine, a super-heater receiving the exhaust from said internal combustion engine, said air compressor communicating with said compressed air engine through said super-heater, a shunt passage leading from the cylinder of said internal combustion engine to said compressed air engine, and a valve-controlled by-pass leading from said shunt passage to said super-heater.

10. The combination with an internal combustion engine, provided with an air chest surrounding its cylinder, of an air compressor driven thereby, a compressed air engine, a super-heater receiving the exhaust from said internal combustion engine, said air compressor communicating with said air chest through said super-heater, a shunt passage leading from the cylinder of said internal combustion engine to said air chest, and a valve-controlled by-pass leading from said shunt passage to said super-heater.

11. The combination with an internal combustion engine, provided with an air chest surrounding its cylinder, of an air compressor driven thereby, an air reservoir consisting of high and low pressure tanks, said air compressor communicating with said low pressure tank, a compressed air engine, a super-heater receiving the exhaust from said internal combustion engine, said air compressor communicating with said air chest through said super-heater, a second air compressor driven by said compressed air engine and communicating with said high pressure tank, a shunt passage leading from the cylinder of said internal combustion engine to said air chest, and a valve controlled by-pass leading from said shunt passage to said super-heater.

12. The combination with an internal combustion engine, of an air compressor connected in tandem therewith, an air reservoir comprising high and low pressure tanks, said air compressor communicating with said low pressure tank, a compressed air engine, a second air compressor connected in tandem with said compressed air engine, a super-heater receiving the exhaust from said internal combustion engine, said air compressor communicating with said air chest through said super-heater, a shunt passage leading from the cylinder of said internal combustion engine to said air chest, and a valve controlled by-pass leading from said shunt passage to said super-heater.

In testimony whereof, I have hereunto set my hand and affixed my seal in the presence of the two subscribing witnesses.

WM. G. THUMMEL. [L. S.]

Witnesses:
W. A. ALEXANDER,
ELIZABETH BAILEY.

---

Copies of this patent may be obtained for five cents each, by addressing the "Commissioner of Patents, Washington, D. C."